United States Patent
Gundavelli et al.

(10) Patent No.: US 11,202,276 B2
(45) Date of Patent: Dec. 14, 2021

(54) TECHNIQUES FOR SUPPORTING USER EQUIPMENT PAGING IN AN ENTERPRISE FABRIC

(71) Applicant: Cisco Technology, Inc., San Jose, CA (US)

(72) Inventors: Srinath Gundavelli, San Jose, CA (US); Sangram Kishore Lakkaraju, Bangalore (IN); Louis Gwyn Samuel, Swindon (GB); Timothy Peter Stammers, Raleigh, NC (US); Alberto Rodriguez Natal, Mountain View, CA (US); Fabio R. Maino, Palo Alto, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 94 days.

(21) Appl. No.: 16/743,258

(22) Filed: Jan. 15, 2020

(65) Prior Publication Data
US 2021/0219261 A1    Jul. 15, 2021

(51) Int. Cl.
*H04W 68/00* (2009.01)
*H04W 52/02* (2009.01)

(52) U.S. Cl.
CPC ..... *H04W 68/005* (2013.01); *H04W 52/0229* (2013.01)

(58) Field of Classification Search
CPC ............... H04W 52/0229; H04W 68/005
See application file for complete search history.

(56) References Cited

U.S. PATENT DOCUMENTS

| 10,448,352 B1 | 10/2019 | Grayson et al. |
| 2006/0014550 A1* | 1/2006 | Ryu ........... H04W 52/0216 455/458 |

(Continued)

FOREIGN PATENT DOCUMENTS

| WO | 2018058324 A1 | 4/2018 |
| WO | 2018138545 A1 | 8/2018 |

OTHER PUBLICATIONS

A. Rodriguez-Natal, "MS-originated SMRs", draft-rodrigueznatal-lisp-ms-smr-09, LISP Working Group, Internet-Draft, Intended status: Informational, Oct. 7, 2019, 7 pages.

(Continued)

*Primary Examiner* — Marcos L Torres
(74) *Attorney, Agent, or Firm* — Edell, Shapiro & Finnan, LLC

(57) ABSTRACT

In one example, a control plane entity obtains an indication that a User Equipment (UE) has entered an idle mode. The control plane entity sets a routing locator corresponding to the UE to cause the control plane entity to trigger a paging request toward the UE to prompt the UE to transition from the idle mode when a first network node obtains a downlink packet destined for the UE. The control plane entity obtains a notification that the first network node has obtained the downlink packet and initiates the paging request toward the UE. The control plane entity updates the routing locator corresponding to the UE to cause the first network node to transmit further downlink packets destined for the UE toward a second network node configured to handle traffic on behalf of the UE.

20 Claims, 9 Drawing Sheets

(56) References Cited

U.S. PATENT DOCUMENTS

| | | | | |
|---|---|---|---|---|
| 2010/0167756 A1* | 7/2010 | Park | ...................... | H04W 68/04 |
| | | | | 455/456.1 |
| 2016/0212778 A1 | 7/2016 | Grootwassink et al. | | |
| 2020/0351817 A1* | 11/2020 | Lee | ....................... | H04W 76/27 |

OTHER PUBLICATIONS

Cisco Systems, Inc., "IP Routing: LISP Configuration Guide, Cisco IOS XE Release 3S", Jul. 27, 2012, 244 pages.

* cited by examiner

US 11,202,276 B2

TECHNIQUES FOR SUPPORTING USER EQUIPMENT PAGING IN AN ENTERPRISE FABRIC

TECHNICAL FIELD

The present disclosure relates to computer networking.

BACKGROUND

A User Equipment (UE) in communication with a network can go into idle mode in order to save battery. In idle mode, only the control channel is up, and the UE does not send or receive any data to or from the network. Paging is a mechanism defined in 3rd Generation Partnership Project (3GPP) architecture in which the network wakes up the UE from idle mode upon detecting downlink traffic destined for the UE. Upon receiving a paging request from the network, the UE may exit the idle mode, and thereby begin sending and/or receiving data.

DESCRIPTION OF EXAMPLE EMBODIMENTS

Overview

In one example embodiment, a control plane entity of a network fabric obtains an indication that a User Equipment (UE) connected to the network fabric has entered an idle mode. In response to obtaining the indication that the UE has entered the idle mode, the control plane entity sets a routing locator corresponding to the UE to cause the control plane entity to trigger a paging request toward the UE to prompt the UE to transition from the idle mode when a first network node of the network fabric obtains a downlink packet destined for the UE. The control plane entity obtains a notification that the first network node has obtained the downlink packet. In response to obtaining the notification that the first network node has obtained the downlink packet, the control plane entity initiates the paging request toward the UE. Upon obtaining an indication that the UE has transitioned from the idle mode, the control plane entity updates the routing locator corresponding to the UE to cause the first network node to transmit further downlink packets destined for the UE toward a second network node of the network fabric configured to handle traffic on behalf of the UE.

Example Embodiments

Figure 1:
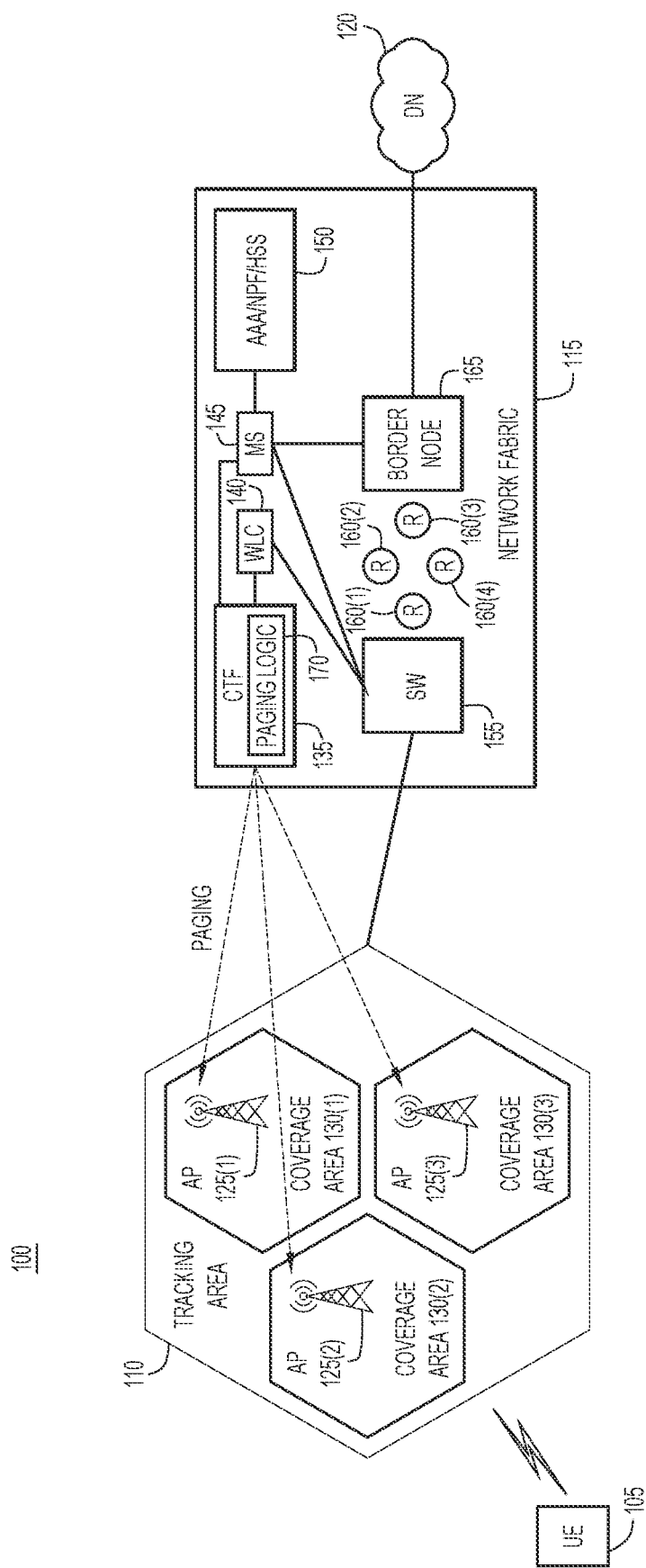
FIG. 1 illustrates a system configured to support User Equipment (UE) paging, according to an example embodiment.

FIG. 1 illustrates an example system 100 configured to support User Equipment (UE) paging. System 100 includes UE 105, tracking area 110, network fabric 115 and Data Network (DN) 120. Tracking area 110 includes Access Points (APs) 125(1)-125(3), which provide network access coverage to respective coverage areas 130(1)-130(3). Network fabric 115 includes a Cellular Termination Function (CTF) 135, Wireless Local Area Network (LAN) Controller (WLC) 140, Map-Server (MS) 145, and any combination of: an Authentication, Authorization, and Accounting (AAA) server/function, a Network Policy Function (NPF), and/or a 3rd Generation Partnership Project (3GPP) Home Subscriber Server (HSS) 150 (referred to herein as AAA/NPF/HSS 150). Network fabric 115 further includes switch 155, network nodes (e.g., routers) 160(1)-160(4), and border node 165.

UE 105 may be associated with any suitable device configured to initiate a flow in system 100. For example, UE 105 may include a computer, a vehicle and/or any other transportation-related device having electronic devices configured thereon, an automation device, an enterprise device, an appliance, an Internet of Things (IoT) device, a Personal Digital Assistant (PDA), a laptop or electronic notebook, a cellular telephone, a smartphone, a tablet, an Internet Protocol (IP) phone, and/or any other device and/or combination of devices, components, elements, and/or objects capable of initiating voice, audio, video, media, or data exchanges within system 100. UE 105 may also include any suitable interface to a human user such as a microphone, a display, a keyboard, or other terminal equipment. UE 105 may also be any device that seeks to initiate a communication on behalf of another entity or element such as a program, a database, or any other component, device, element, or object capable of initiating an exchange within system 100. UE 105 may be configured with appropriate hardware (e.g., processor(s), memory element(s), antennas and/or antenna arrays, baseband processors (modems), and/or the like), software, logic, and/or the like to facilitate respective over-the-air (air) interfaces for accessing/connecting to APs 125(1)-125(3). It will be appreciated that any number of UEs may be present in system 100.

One or more of APs 125(1)-125(3) may be cellular APs that terminate a cellular (e.g., 4G Long-Term Evolution (LTE) or 5G New Radio (NR)) air interface and may be configured with appropriate hardware (e.g., processor(s), memory element(s), antennas and/or antenna arrays, baseband processors (modems), and/or the like), software, logic, and/or the like to provide over-the-air coverage for a private cellular access network (e.g., private 4G LTE, private 5G NR, private Citizens Broadband Radio Service (CBRS), etc.). By 'private' it is meant that a private cellular access network provides network connectivity/services to clients (e.g., UE 105) served by a network operator and/or service provider of the private cellular access network, such as an enterprise. In one example, a private cellular access network may be considered to be a network that may be implemented to serve enterprise purposes (e.g., business purposes, government purposes, educational purposes, etc.) for enterprise clients (e.g., enterprise users/devices/etc.) in which the private cellular access network may be operated by any combination of traditional mobile network operators/service providers, enterprises network operators/service providers, and/or third party network operators/service providers (e.g., neutral host network operators/service providers, cloud service providers, etc.). In various embodiments, APs 125(1)-125(3) may be implemented as any combination of an evolved Node B (eNB) to facilitate 4G LTE air accesses, a next generation Node B (gNB) to facilitate 5G NR air accesses, a next generation (nG) radio to facilitate any next generation air accesses, a CBRS Device (CBSD) to facilitate CBRS accesses, and/or the like now known or hereafter developed.

One or more of APs 125(1)-125(3) may be Wireless LAN (WLAN) APs configured with appropriate hardware (e.g., processor(s), memory element(s), antennas and/or antenna arrays, baseband processors (modems), and/or the like), software, logic, and/or the like to provide over-the-air coverage for a WLAN access network (e.g., Wi-Fi®). In various embodiments, one or more of APs 125(1)-125(3) may be implemented as Wi-Fi APs and/or the like. Although illustrated as separate APs, in some embodiments one or more of APs 125(1)-125(3) may be combined APs to provide any combination of cellular and WLAN accesses.

Network fabric 115 may be associated with a private network, such as a software-defined access fabric configured specifically for use by users associated with an enterprise. In one example, the user of UE 105 is an employee of the enterprise associated with network fabric 115.

CTF 135 may be a control plane entity that provides or is responsible for any combination of cellular-based access authentication services, authorization services, mobility management control, session management services with various functions being supported on a per-session basis, selection and control of user plane entities (e.g., per-session), if applicable, and/or the like. In various embodiments, CTF 135 may be implemented with functionality as may be inherited from any combination of a 4G LTE Mobility Management Entity (MME); a Serving Gateway (SGW), and/or a Packet Data Network (PDN) Gateway (PGW); a 5G Access and Mobility Management Function (AMF) and/or Session Management Function (SMF); and/or the like now known or hereafter developed. In one example, CTF 135 may terminate the S1-MME interface (in the 4G case) or the N1 interface (in the 5G case) from one or more of APs 125(1)-125(3) (e.g., one or more eNBs/gNBs).

WLC 140 may be a control plane entity that provides or is responsible for WLAN functions such as WLAN-based access authentication services, authorization services, intrusion prevention, Radio Frequency (RF) management, and/or the like to facilitate UE 105 connectivity via one or more of APs 125(1)-125(3). In some implementations, WLC 140 may be configured as an evolved WLC (eWLC). CTF 135 and WLC 140 may be configured as separate entities or as combined or converged as a single multi-access termination function configured to provide operations, functions, etc. for multiple accesses that may be provided via APs 125(1)-125 (3).

MS 145 is a control plane entity (e.g., a Locator Identity (ID) Separation Protocol (LISP) function) that represents a distributed mapping database and service that accepts registration information for clients and/or other endpoint users/devices, etc. (e.g., UE 105), and stores mappings between numbering or name space constructs. LISP is a control plane protocol that may facilitate IP mobility for system 100. Although embodiments herein provide example details associated with a LISP implementation, other control plane protocols may be implemented for system 100 including, but not limited to, Proxy Mobile IP version 6 (PMIPv6), Identifier Locator Addressing (ILA), etc.

A LISP implementation may utilize various constructs including Routing Locators (RLOCs) that may be associated with edge and border switches (e.g., switch 155) and Endpoint Identifiers (EIDs) that may be associated with/identify clients or other endpoints (e.g., UE 105) in order to facilitate mobility for network fabric 115. An RLOC is an IP address associated with an element in which the nomenclature 'RLOC=element' may generally represent an RLOC set to the IP address of the element. IP addresses as discussed for embodiments described herein may be implemented as IP version 4 (IPv4) and/or IPv6 addresses. Other variations for setting an RLOC may be envisioned using, for example, Type-Length-Value (TLV) expressions, or the like.

For the LISP implementation of system 100, MS 145 may store mappings, generally known as EID-to-RLOC mappings, between RLOCs for fabric switches/functions/etc. (e.g., switch 155) and EIDs for clients (e.g., UE 105) for which traffic is handled or otherwise associated with the switches/functions/etc. MS 145 may associate EIDs with any combination of IP and/or Media Access Control (MAC) addresses for a client for different EID-to-RLOC mappings that may be maintained/managed within network fabric 115. MS 145 may also communicate EID-to-RLOC mapping information to various elements of network fabric (e.g., WLC 140, AAA/NPF/HSS 150 etc.). MS 145 may include map resolver functionality such as obtaining map request messages and processing/forwarding those messages for MS 145. Such information may be stored in the map-cache of the elements to facilitate routing via network fabric 115.

AAA/NPF/HSS 150 may provide/be responsible for any combination of: providing authentication, authorization, and accounting functions for clients (e.g., UE 105) that may be present in system 100; managing subscription/policy information for one or more clients that may be present in system 100 (e.g., access profile information, as discussed below, among other subscription/policy information); maintaining per-client session information for various accesses to which each client is connected; combinations thereof; and/or the like. In various embodiments, AAA/NPF/HSS 150 may be implemented as any combination of standalone and/or combined elements (e.g., separate AAA, NPF, and HSS elements; a combined AAA/HSS element without an NPF element; an AAA element and an NPF element without an HSS element; etc.) in order to facilitate authentication, authorization, and accounting operations (referred to herein as 'AAA-based' operations) as well as policy-based operations for network fabric 115.

Generally, authentication refers to the process where an entity's identity is authenticated, typically by providing evidence that it holds a specific digital identity such as an identifier/identity and corresponding credentials/authentication attributes/etc. Generally, authorization can be used to determine whether a particular entity is authorized to perform a given activity, typically inherited from authentication when logging on to an application or service. In various instances, authorization may be determined based on a range of restrictions, for example time-of-day restrictions, or physical location restrictions, or restrictions against multiple accesses by the same entity or user/device. Generally, accounting refers to the tracking of network resource consumption by users/devices for the purpose of capacity and trend analysis, cost allocation, billing, etc. It will be appreciated that AAA/NPF/HSS 150 may include cellular authentication and WLAN authentication functionality distributed across one or more servers.

In various embodiments, AAA/NPF/HSS 150 may be configured with or obtain (e.g., from an external database/service/etc.) per-client access profile information that may include, but not be limited to, client (e.g., user/device) identity information, authentication type attributes (e.g., authentication type, sub-type, etc.), authentication attributes (e.g., credentials, passwords, keys, etc.), combinations thereof, and/or the like. Additionally, AAA/NPF/HSS 150 may be configured with or obtain (e.g., from an external database/service/etc.) per-client subscription/policy information that may include, but not be limited to, service quality information such as Quality of Service (QoS) information, QoS Class Identifier (QCI), Guaranteed Bit Rate (GBR), Maximum Bit Rate (MBR), Aggregate Maximum Bit Rate (AMBR), Allocation and Retention Priority (ARP), packet delay information, packet loss information, combinations thereof, and/or the like for one or more client sessions. In various embodiments, subscription/policy information may also include a 3GPP service name such as AP Name (APN) information (for 4G networks), Data Network Name (DNN) information (for 5G networks), combinations thereof, and/or the like for one or more client sessions.

In various embodiments, AAA/NPF/HSS 150 may be configured with one or more databases/repositories/etc. and/or may interface with one or more external databases/repositories/etc. in order to obtain and/or be configured with access profile information, subscription/policy information, etc. for clients. Such internal/external databases/repositories/etc. may include any combination of enterprise databases, repositories, and/or the like for one or more clients that may be allowed to connect to accesses with which network fabric 115 may interface. In various embodiments, AAA/NPF/HSS 150 may be implemented as an AAA server, an enterprise policy server/manager, a 3GPP HSS, combinations thereof, and/or the like.

AAA/NPF/HSS 150 may be capable of interfacing/communicating with other elements of system 100 (e.g., CTF 135 and WLC 140) via any combination of Remote Authentication Dial-In User Service (RADIUS) protocol mechanisms (e.g., messaging, signaling, etc.), DIAMETER protocol, 3GPP S6a interface mechanisms, Sha-based interface mechanisms (e.g., for architectures that may involve interfaces based on, but not strictly adhering, to 3GPP defined Sha interface mechanisms), Application Programming Interface (API) mechanisms (e.g., for messaging, signaling, etc. that may be defined by an enterprise, 3rd-party, application, etc.), fabric-defined interfaces (e.g., as may be defined by an enterprise), combinations thereof, and/or the like.

Switch 155 and network nodes 160(1)-160(4) may transmit user plane packets between APs 125(1) and DN 120. In particular, switch 155 may be any suitable network node configured to obtain/provide network communications (e.g., packets) from/to APs 125(1)-125(3), and network nodes 160(1)-160(4) may be any suitable network node configured to transmit network communications between switch 155 and border node 165, and border node 165 may be any suitable network node associated with DN 120 configured to obtain/provide network communications from/to DN 120. Border node 165 may be an edge router for network fabric 115. In one example, switch 155 and/or border node 165 are IP forwarding elements that support the LISP ingress/egress Tunnel Router (xTR) functions. Switch 155 may also be referred to interchangeably as a "fabric edge node" and border node 165 may also be referred to interchangeably as a "fabric border node." In one example, network nodes 160(1)-160(4) may be underlay network elements unaware of LISP operations.

In various embodiments, DN 120 may be any combination of the Internet, an Internet Protocol (IP) Multimedia Subsystem (IMS), Ethernet network, Ethernet switching system(s), and/or the like. DN 120 may facilitate user plane (e.g., user data/data transfer) connectivity for per-access UE 105 sessions. For example, UE 105 may access various services, applications, etc. from DN 120.

Although various interconnections/interfaces among various elements of network fabric 115 are illustrated in FIG. 1 (e.g., among control plane entities such as CTF 135, WLC 140, MS 145, and AAA/NPF/HSS 150, and/or among user plane entities such as switch 155, network nodes 160(1)-160(4), and border node 165) it is to be understood that any elements of network fabric 115 may be interconnected and/or interface using any wired and/or wireless connections to facilitate communications, operations, etc. among the elements as discussed for techniques described herein.

In one example, UE 105 is initially located in coverage area 130(1) and is connected with network fabric 115 via AP 125(1). At some point, UE 105 enters an idle mode in which no data can be sent (or received) to (or from) UE 105. Typically, upon receiving a notification that a UE entered idle mode, an MME would trigger a Release Access Bearer request over an S11 interface towards a SGW. Furthermore, a PGW would typically receive a downlink packet destined for the UE, and then send a trigger to the MME/SGW to cause the MME/SGW to send an S1AP paging message to one or more eNBs. The MME would forward the paging message to eNBs within the relevant tracking area. For example, the MME might page the last known location of the UE (before the UE entered idle mode), and if there is no response, expand the paging area (e.g., by sending the paging request to more eNBs). Upon receiving the paging request, the UE would establish a radio connection with the eNB to establish S1-App and S1-U connections with the MME and SGW.

System 100 integrates the 3GPP control plane with a network fabric based user plane (e.g., a software-defined access fabric) to provide private cellular and/or WLAN services in the enterprise architecture context. In system 100, there is no PGW, SGW, or S11 interface, and, as such, system 100 cannot ensure that the idle state is reflected in the fabric user plane using conventional approaches. Therefore, standard approaches are not effective for providing a paging mechanism to wake up UE 105 from idle mode in system 100.

Accordingly, paging logic 170 may be provided in CTF 135 to enable handling/processing of idle mode and paging messages in system 100 and other similar systems that enable private cellular and/or WLAN enterprise networks. In one example, CTF 135 obtains an indication that UE 105 has entered an idle mode. In response to obtaining the indication that UE 105 has entered the idle mode, CTF 135 provides instructions to cause CTF 135 to be notified when border node 165 obtains, from DN 120, a downlink packet destined for UE 105. Some time later, CTF 135 obtains a notification that border node 165 has obtained the downlink packet, and, in response to obtaining the notification that border node 165 has obtained the downlink packet, causes a paging request to be provided to UE 105 to prompt UE 105 to exit the idle mode. CTF 135 may obtain an indication that UE 105 has exited the idle mode and provide instructions to cause border node 165 to transmit further downlink packets destined for UE 105 toward switch 155.

A "correspondent node" may be a network node that originates/provides the downlink packet toward UE 105. In the aforementioned example, the correspondent node is in DN 120 (i.e., outside the domain of network fabric 115), and therefore the downlink packet hits border node 165. However, the correspondent node may also/alternatively be another UE that is also part of the domain of network fabric 115. In that case, the downlink packet may enter via another network node, such as an edge switch (e.g., switch 155). It will be appreciated that techniques described herein may apply to switch 155, border node 165, or any other suitable network node that supports the LISP xTR functions. In particular, the paging trigger may occur at the originating point of the fabric tunnel, or the fabric node closer to the correspondent node.

Figure 2A:
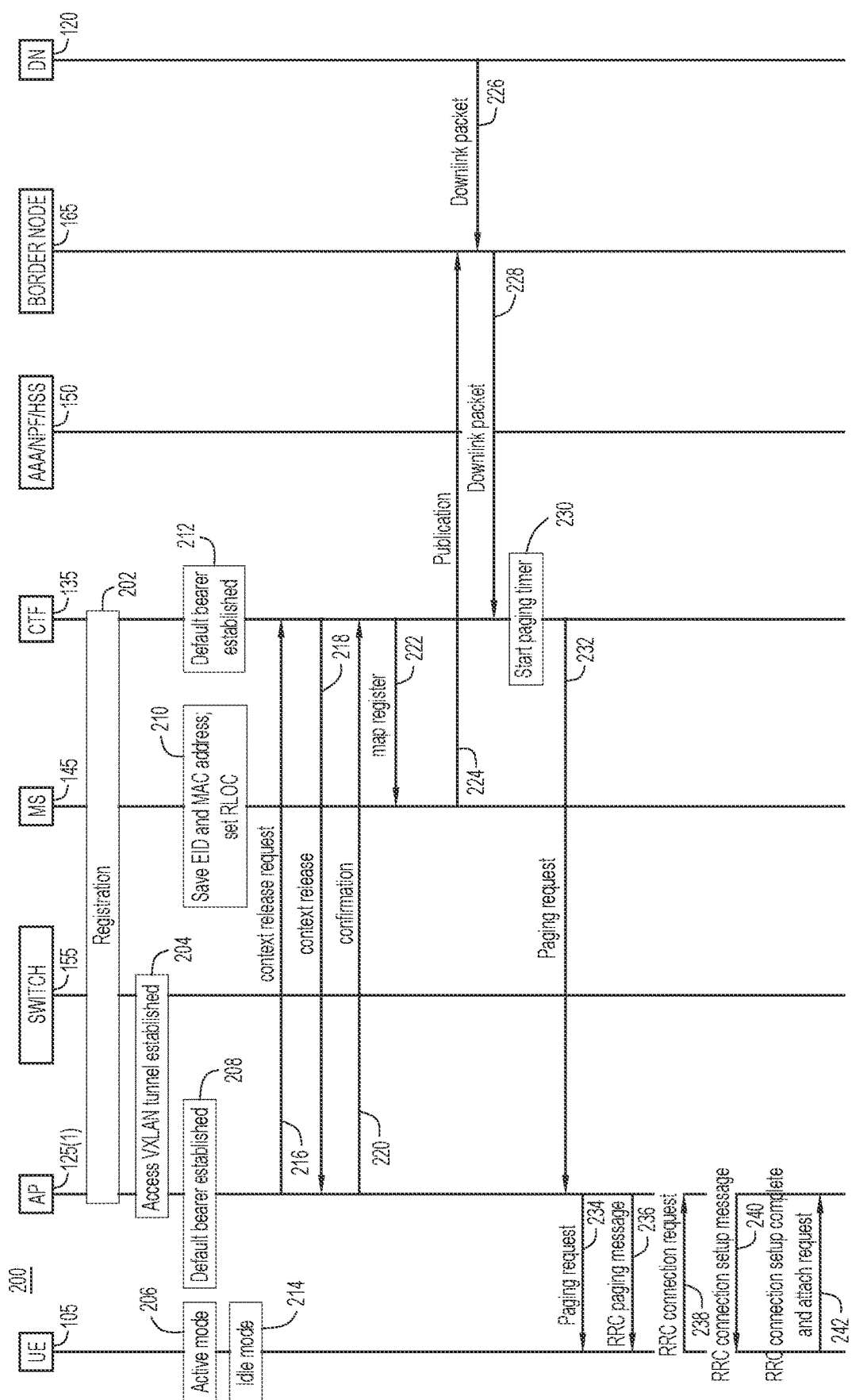
FIGS. 2A and 2B collectively illustrate a flow diagram of a method for supporting UE paging, according to an example embodiment.
Figure 2B:
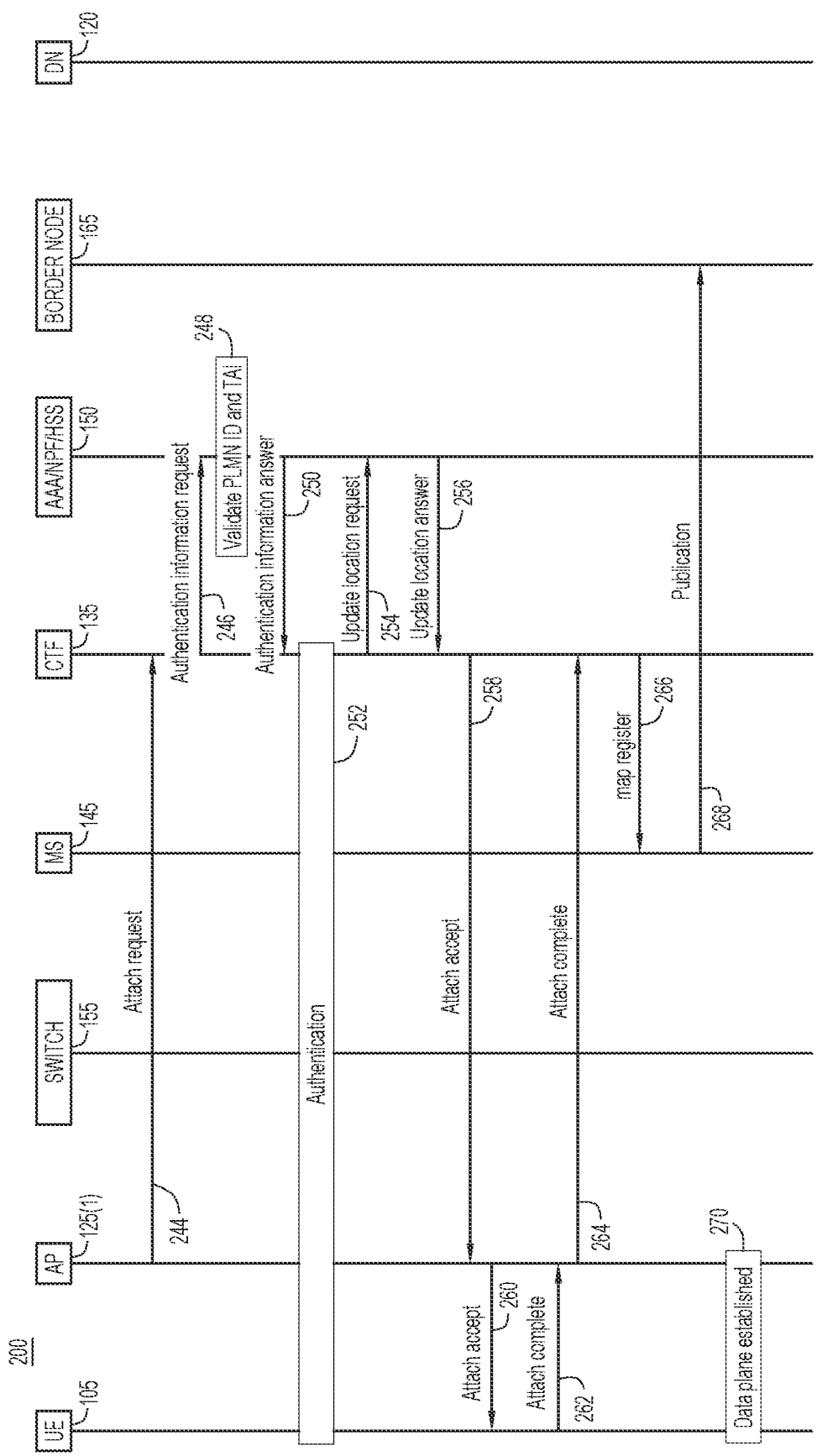

With continuing reference to FIG. 1, FIGS. 2A and 2B collectively illustrate a flow diagram of a method 200 for supporting UE paging. At 202, AP 125(1) registers with CTF 135 and CTF 135 learns the RLOC for AP 125(1). APs 125(2) and 125(3) may also register with CTF 135, and thus CTF 135 may learn the RLOCs for all APs 125(1)-125(3). Although switch 155 is illustrated in FIG. 1 as the RLOC for APs 125(1)-125(3), it will be appreciated that AP 125(1) may have associated therewith a first network node corresponding to a first RLOC, AP 125(2) may have associated therewith a second network node corresponding to a second RLOC, and AP 125(3) may have associated therewith a third network node corresponding to a third RLOC.

At 204, a Virtual Extensible Local Area Network (VXLAN) access tunnel is established between AP 125(1) and switch 155. At 206, UE 105 enters an active mode and may send/receive data packets to/from DN 120 (via AP 125(1) and network fabric 115). At 208, AP 125(1) establishes a default bearer for UE 105. At 210, MS 145 saves/stores the EID and Media Access Control (MAC) address for UE 105 and sets the RLOC corresponding to the EID to switch 155. At 212, CTF 135 establishes the default bearer for UE 105.

At 214, UE 105 enters an idle mode. AP 125(1) may determine that UE 105 has entered the idle mode in response to the expiration of an idle timer during which no communications were sent to or received from UE 105. In response to the expiration of the idle timer, at 216 CTF 135 obtains an indication that UE 105 has entered the idle mode. More specifically, CTF 135 obtains, from AP 125(1), a context release request for UE 105 due to inactivity of UE 105. The context release request may specify the S1AP ID assigned by AP 125(1) to UE 105, the International Mobile Subscriber ID (IMSI) of UE 105, and the Tracking Area ID (TAI) of UE 105. At 218, CTF 135 provides, to AP 125(1), a context release message prompting AP 125(1) to release those radio resources reserved for UE 105. At 220, CTF 135 obtains, from AP 125(1), a confirmation of context release for UE 105.

At 222, CTF 135 provides instructions to cause CTF 135 to be notified when border node 165 (or any suitable data plane xTR node attempting to locate the RLOC for UE 105) obtains, from DN 120, a downlink packet destined for UE 105. In this example, CTF 135 provides instructions to provide a trigger to CTF 135 to notify CTF 135 when there is a downlink packet that needs to be delivered to UE 105. There are many possible approaches for providing this trigger. In the example of FIG. 2, the approach is to provide the trigger by directly forwarding the downlink packet to CTF 135. In this case CTF 135 is updated as the RLOC corresponding to UE 105, the downlink packet is delivered to CTF 135, and the downlink packet itself serves as the trigger to CTF 135 for initiating the paging process.

In other approaches (discussed below), a network node (e.g., switch 155 or border node 165) is updated as the RLOC corresponding to UE 105, and the network node may provide a control plane message to CTF 135 (or cause a control plane message to be provided to CTF 135). One approach may involve sending a control plane message to CTF 135 to prompt CTF 135 to initiate the paging process. Another approach may involve sending a control plane message to MS 145, which triggers MS 145 to send a map notify message to CTF 135 to prompt CTF 135 to initiate the paging process. In these other approaches, the network node may buffer or drop the downlink packet.

In the example of FIG. 2, CTF 135 initiates a map register function in the form of a message to MS 145 specifying CTF 135 as the new RLOC of UE 105. This causes a downlink IP packet destined for UE 105 to be forwarded to CTF 135 in order to prompt CTF 135 to initiate paging procedures. CTF 135 thus replaces switch 155 as the RLOC of UE 105. Switch 155 should not remain as the RLOC of UE 105 when UE 105 is in the idle mode state because UE 105 may switch locations while in idle mode and move to an AP associated with a different network node. In other words, switch 155 may no longer be the appropriate network node to receive downlink packets on behalf of UE 105, because UE 105 may be reachable through a different network node when UE 105 returns to active mode. Switching the RLOC of UE 105 to CTF 135 may account for the possibility that UE 105 has moved to another AP/network node.

At 224, MS 145 provides, to border node 165, an unsolicited Publication specifying the Layer 3 (L3) VXLAN ID (VNID) of the IP address of UE 105, and indicating that CTF 135 is the new RLOC for UE 105. In LISP terminology, a VNID is referred to as a LISP Instance-ID (IID). Typically, a LISP IID is rendered into a VXLAN VNID in data plane elements (e.g., xTRs) for encapsulation. Thus, for various examples/discussions provided herein, it is to be understood that a VNID may also refer to a LISP In one example, the Publication may include the EID of UE 105 and the RLOC of CTF 135. Removing the RLOC associated with the EID of UE 105 may cause the idle state to be reflected in the fabric user plane, thereby enabling interworking between the 3GPP control plane elements and the fabric user plane. In one sense a mobility event of UE 105 is activated as a response to the idle timeout event, bringing CTF 135 into the path for downlink traffic destined for UE 105 (e.g., for a transient period of time while UE 105 is being paged). CTF 135 may thus detect any downlink data destined for UE 105. MS 145 may provide similar indications to any entities that have asked to receive updates regarding the mapping for the EID of UE 105 (e.g., including the xTR to which UE 105 was previously logically attached). There may be xTRs in network fabric 115 that have a map-cache entry for the EID of UE 105 but have not asked to be notified for mapping updates for that EID, but if those xTRs send data traffic to the previous xTR using a stale map-cache entry, the previous xTR may redirect the data traffic to CTF 135 and send a data-triggered Solicit-Map-Request (SMR) back to the xTR originating the traffic to notify that xTR that the xTR should update the xTR map-cache for that entry.

At 226, border node 165 obtains a downlink packet destined for UE 105 from DN 120. The map entry at border node 165 for the EID of UE 105 indicates that CTF 135 is the corresponding RLOC, prompting border node 165 to forward the packet to CTF 135. Alternatively, border node 165 may provide a control plane message to CTF 135 indicating that CTF 135 should initiate paging to UE 105. At 228, CTF 135 obtains a notification that border node 165 has obtained the downlink packet. In this example, the notification that border node 165 has obtained the downlink packet is the downlink packet itself. For example, CTF 135 may obtain the downlink packet through a VXLAN fabric tunnel from border node 165 and conclude that border node 165 has obtained the downlink packet. In one example, CTF 135 may buffer the downlink packet and later forward the downlink packet when UE 105 enters the connected mode with MS 145 reflecting a registered RLOC for the EID of UE 105.

Upon receiving the downlink IP packet indicating a destination that matches the IP address of UE 105, CTF 135 starts a paging timer for UE 105 at 230. At 232, CTF 135 causes a paging request to be provided to UE 105 to prompt UE 105 to exit the idle mode. In this example, CTF 135 provides a paging request for UE 105 to AP 125(1). The paging request may include the IMSI of UE 105 and the relevant TAI. CTF 135 may also/alternatively provide the paging request to other APs (e.g., APs 125(2) and 125(3)) to account for the possibility that UE 105 moved locations while in idle mode. CTF 135 may provide paging requests to one or more of APs 125(1)-125(3) according to any suitable process (e.g., in any suitable order). For example, CTF 135 may first send a paging request to AP 125(1), and if it is determined that UE 105 is not communicable via AP 125(1), may then send paging requests to APs 125(2) and/or 125(3). APs 125(1)-125(3) need not necessarily be in the same tracking area.

At 234, AP 125(1) provides the paging request to UE 105. At 236, AP 125(1) provides a Radio Resource Control (RRC) paging message. At 238, UE 105 provides an RRC connection request to AP 125(1). At 240, AP 125(1) provides an RRC connection setup message to UE 105. At 242, UE 105 provides, to AP 125(1), an indication that the RRC connection setup is complete. UE 105 may also provide an attach request that specifies a Globally Unique Temporary Identity (GUTI) or IMSI of UE 105, an attach type, and a network access server key set. At 244, CTF 135 obtains an indication that UE 105 has exited idle mode in the form of an attach request from AP 125(1). The attach request may specify the GUTI or IMSI of UE 105 and the attach type. At 246, CTF 135 provides, to AAA/NPF/HSS 150, an authentication information request including the IMSI, Public Land Mobile Network (PLMN) ID, and TAI. At 248, AAA/NPF/HSS 150 validates the PLMN ID and TAI. At 250, CTF 135 obtains an authentication information answer (e.g., an authentication vector) from AAA/NPF/HSS 150. At 252, UE 105 is authenticated.

At 254, CTF 135 provides an update location request to AAA/NPF/HSS 150. The update location request may include the IMSI and PLMN ID. At 256, CTF 135 obtains an update location answer from AAA/NPF/HSS 150. The update location answer may include the relevant IMSI, Mobile Station International Subscriber Directory Number (MSISDN), APN, and QCI. At 258, CTF 135 provides an attach accept message to AP 125(1). The attach accept message may include the IP address of UE 105 and an uplink Tunnel Endpoint ID (TED)/Generic Routing Encapsulation (GRE) key for UE 105. At 260, AP 125(1) provides a Non-Access Stratum (NAS) attach accept message to UE 105 and, at 262, obtains an attach complete message from UE 105. At 264, CTF 135 obtains an attach complete message from AP 125(1). The attach complete message may include the uplink TEID/GRE key for UE 105.

At 266, CTF 135 provides instructions to cause border node 165 to transmit further downlink packets destined for UE 105 toward switch 155. More specifically, CTF 135 initiates a map register function in the form of a message to MS 145 specifying switch 155 as the new RLOC of UE 105. This causes any downlink IP packets destined for UE 105 to be forwarded to switch 155 (and then to UE 105). Switch 155 thus replaces CTF 135 as the RLOC of UE 105. At 268, MS 145 provides, to border node 165, an unsolicited Publication specifying the L3 VNID of the IP address of UE 105, and indicating that switch 155 is the new RLOC for UE 105. MS 145 may provide a similar indication to other xTR nodes. Thus, the map entry and cache at various xTR nodes may be updated to remove CTF 135 from the path of the user plane traffic. Network fabric 115 may now forward the downlink traffic to switch 155. At 270, a data plane is established between UE 105 and AP 125(1). In a further example, CTF 135 may send the buffered downlink packet to UE 105 in order to prevent UE 105 from missing the initial downlink packet.

Figure 3A:
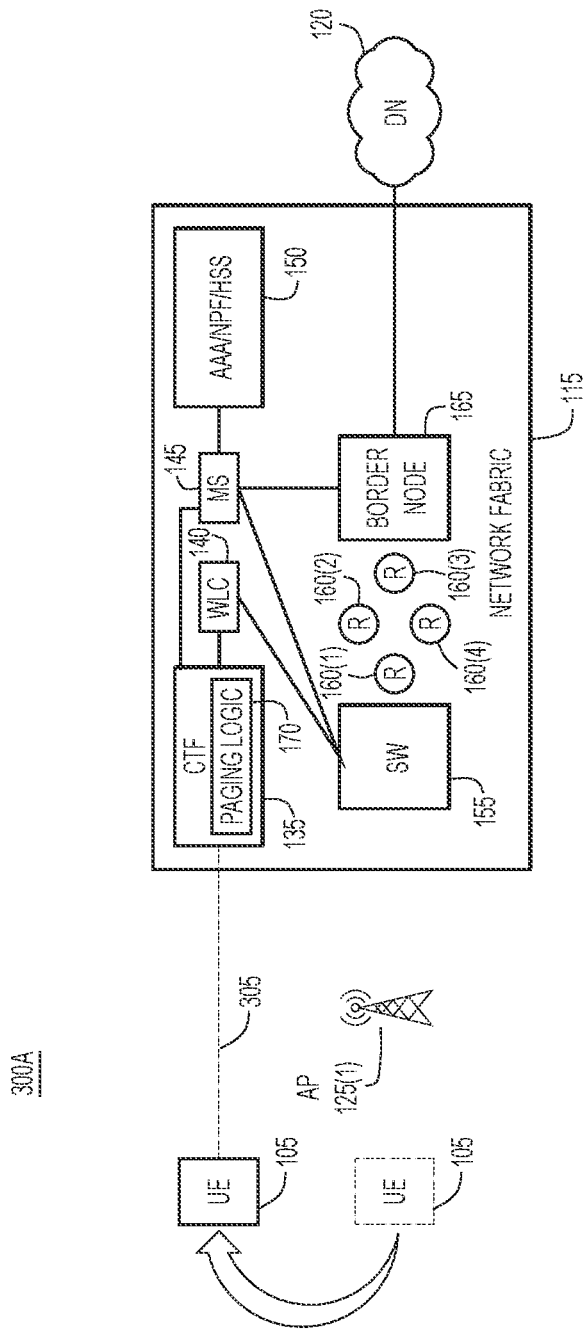
FIGS. 3A-3D illustrate graphical representations of UE mobility from a forwarding perspective when the UE transitions between an idle mode (e.g., Radio Resource Control (RRC) idle mode) and a connected mode (e.g., RRC connected mode), according to an example embodiment.
Figure 3B:
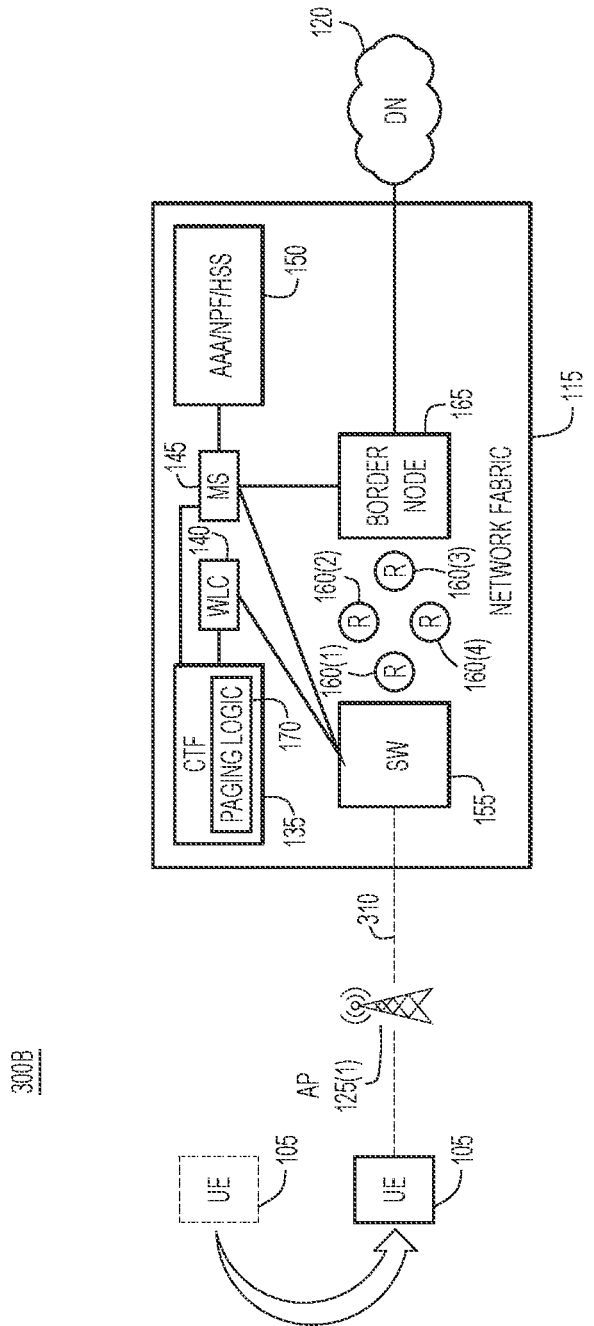

FIGS. 3A and 3B illustrate example graphical representations 300A and 300B of UE mobility from a forwarding perspective when UE 105 transitions between an idle mode (e.g., RRC idle mode) and a connected mode (e.g., RRC connected mode) according to method 200. Graphical representation 300A illustrates a fabric mobility event in which UE 105 enters idle mode. Here, network fabric 115 hides (in a forwarding sense, as illustrated by dashed line 305) UE 105 behind CTF 135 when the network detects that the idle timer has expired and the reachability state of UE 105 is unknown. To accomplish this, network fabric 115 registers CTF 135 as the RLOC for UE 105 upon detecting the expiry of the idle timer. Thus, CTF 135 is in the forwarding path of UE 105 for a transient period of time so CTF 135 may detect the downlink traffic destined for UE 105 and initiate the appropriate paging procedures.

Graphical representation 300B illustrates a fabric mobility event in which UE 105 exits idle mode (e.g., comes back online after the paging procedures). The forwarding state of CTF 135 in the forwarding path for UE 105 is subsequently removed when UE 105 wakes up and goes into connected mode. Once the state is reversed, CTF 135 is no longer in the path for the downlink traffic destined for UE 105. Instead, the forwarding state reflects the RLOC of switch 155 (as illustrated by dashed line 310), or any other suitable network node currently serving as the RLOC for UE 105. As shown, UE 105 is now attached to switch 155. Thus, CTF 135 may be brought into the user plane path when needed, and may be removed from the user plane path when not needed.

In one alternative example to method 200, CTF 135 may provide instructions to cause CTF 135 to be notified when border node 165 obtains the downlink packet from DN 120 by providing instructions to provide a control plane message (instead of the downlink packet itself) to CTF 135. CTF 135 may obtain an indication that UE 105 has entered an idle mode, and, in response, provide the instructions to provide the control plane message to CTF 135. Providing the instructions may include providing MS 145 with an update indicating that UE 105 is reachable via the RLOC of border node 165 (e.g., associating the EID of UE 105 with the RLOC of border node 165) and that if there is a packet for UE 105, border node 165 is to notify CTF 135 with a control plane message.

When border node 165 obtains a new downlink packet, border node 165 determines that the downlink packet is destined for UE 105, and that the associated RLOC is the RLOC of border node 165 itself. Border node 165 also determines that border node 165 is to send the control plane message to CTF 135 (e.g., over Hypertext Transfer Protocol (HTTP) or any other suitable protocol). Border node 165 may additionally drop the downlink packet, or buffer the downlink packet for delivery when the RLOC changes from the RLOC of border node 165. CTF 135 obtains the control plane message indicating that border node 165 obtained the downlink packet, and, in response, activates the paging process. UE 105 wakes up from idle mode and registers with switch 155, and MS 145 and border node 165 have states reflecting UE 105 as reachable via the RLOC corresponding to switch 155 (or to a network node associated with another AP, such as AP 125(2) or AP 125(3)). For example, MS 145 may provide a map update to border node 165. Border node 165 may provide the buffered downlink packet, and any further downlink packets destined for UE 105, to UE 105.

In another alternative example to method 200, CTF 135 may provide instructions to cause CTF 135 to be notified when border node 165 obtains the downlink packet from DN 120 by providing instructions to provide a control plane message (instead of the downlink packet itself) to MS 145. CTF 135 may obtain an indication that UE 105 has entered an idle mode, and, in response, provide the instructions to provide the control plane message to CTF 135. Providing the instructions may include providing MS 145 with an update indicating that UE 105 is reachable via the RLOC of border node 165 (e.g., associating the EID of UE 105 with the RLOC of border node 165) and that if there is a packet for UE 105, border node 165 is to notify MS 145 with a control plane message.

When border node 165 obtains a new downlink packet, border node 165 determines that the downlink packet is destined for UE 105, and that the associated RLOC is the RLOC of border node 165 itself. Border node 165 also determines that border node 165 is to send an update to MS 145. Border node 165 may additionally buffer the downlink packet. Border node 165 sends the update to MS 145 to switch the mapping of the EID of UE 105 to the RLOC of CTF 135. This triggers MS 145 to send a control plane message (e.g., a map notify message) to CTF 135. CTF 135 obtains the control plane message indicating that border node 165 obtained the downlink packet, and, in response, activates the paging process. UE 105 wakes up from idle mode and registers with switch 155, and MS 145 and border node 165 have states reflecting UE 105 as reachable via the RLOC corresponding to switch 155 (or to a network node associated with another AP, such as AP 125(2) or AP 125(3)). For example, MS 145 may provide a map update to border node 165. Border node 165 may provide the buffered downlink packet, and any further downlink packets destined for UE 105, to UE 105.

Figure 3C:
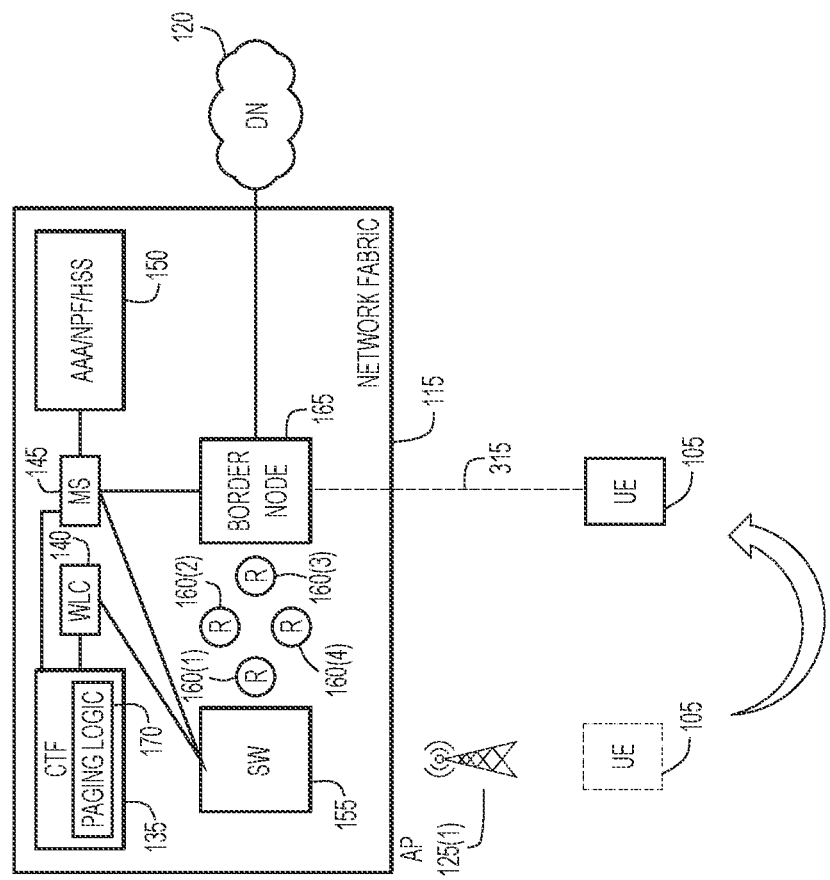
Figure 3D:
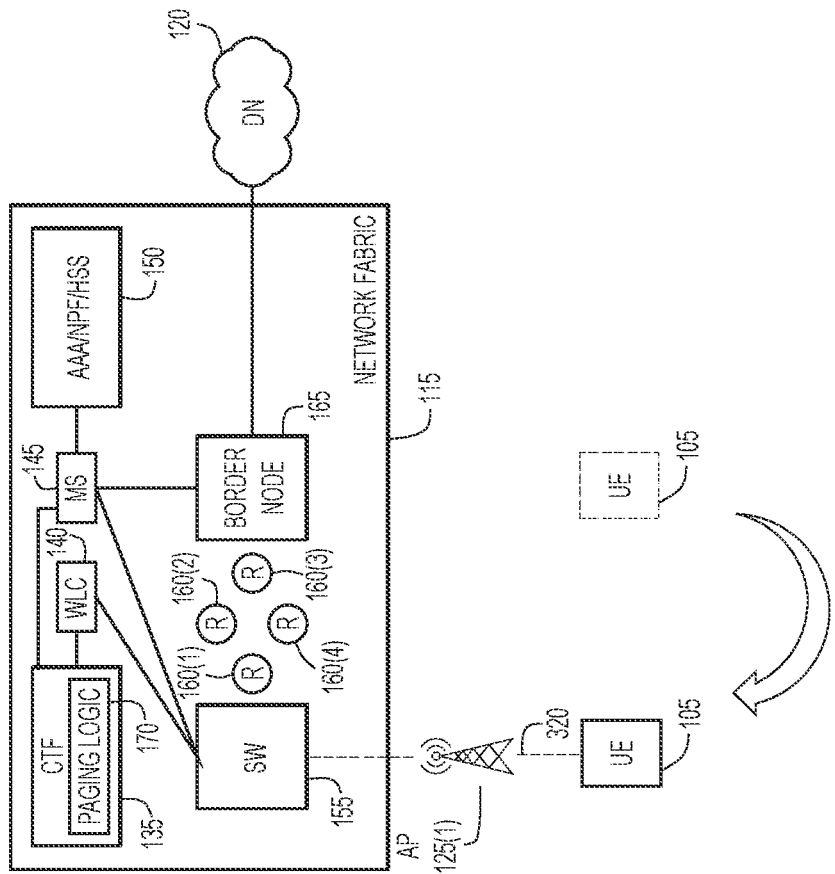

FIGS. 3C and 3D illustrate example graphical representations 300C and 300D of UE mobility from a forwarding perspective when UE 105 transitions between an idle mode (e.g., RRC idle mode) and a connected mode (e.g., RRC connected mode) according to the alternative examples to method 200. Graphical representation 300C illustrates a fabric mobility event in which UE 105 enters idle mode. Here, network fabric 115 hides (in a forwarding sense, as illustrated by dashed line 315) UE 105 behind border node 165 when the network detects that the idle timer has expired and the reachability state of UE 105 is unknown. To accomplish this, network fabric 115 registers border node 165 as the RLOC for UE 105 upon detecting the expiry of the idle timer. Thus, border node 165 is in the forwarding path of UE 105 for a transient period of time so border node 165 may detect the downlink traffic destined for UE 105 and initiate the appropriate paging procedures.

Graphical representation 300D illustrates a fabric mobility event in which UE 105 exits idle mode (e.g., comes back online after the paging procedures). The forwarding state of border node 165 in the forwarding path for UE 105 is subsequently removed when UE 105 wakes up and goes into connected mode. Once the state is reversed, border node 165 is no longer in the path for the downlink traffic destined for UE 105. Instead, the forwarding state reflects the RLOC of switch 155 (as illustrated by dashed line 320), or any other suitable network node currently serving as the RLOC for UE 105. As shown, UE 105 is now attached to switch 155. Thus, border node 165 may be brought into the user plane path when needed, and may be removed from the user plane path when not needed.

Figure 4:
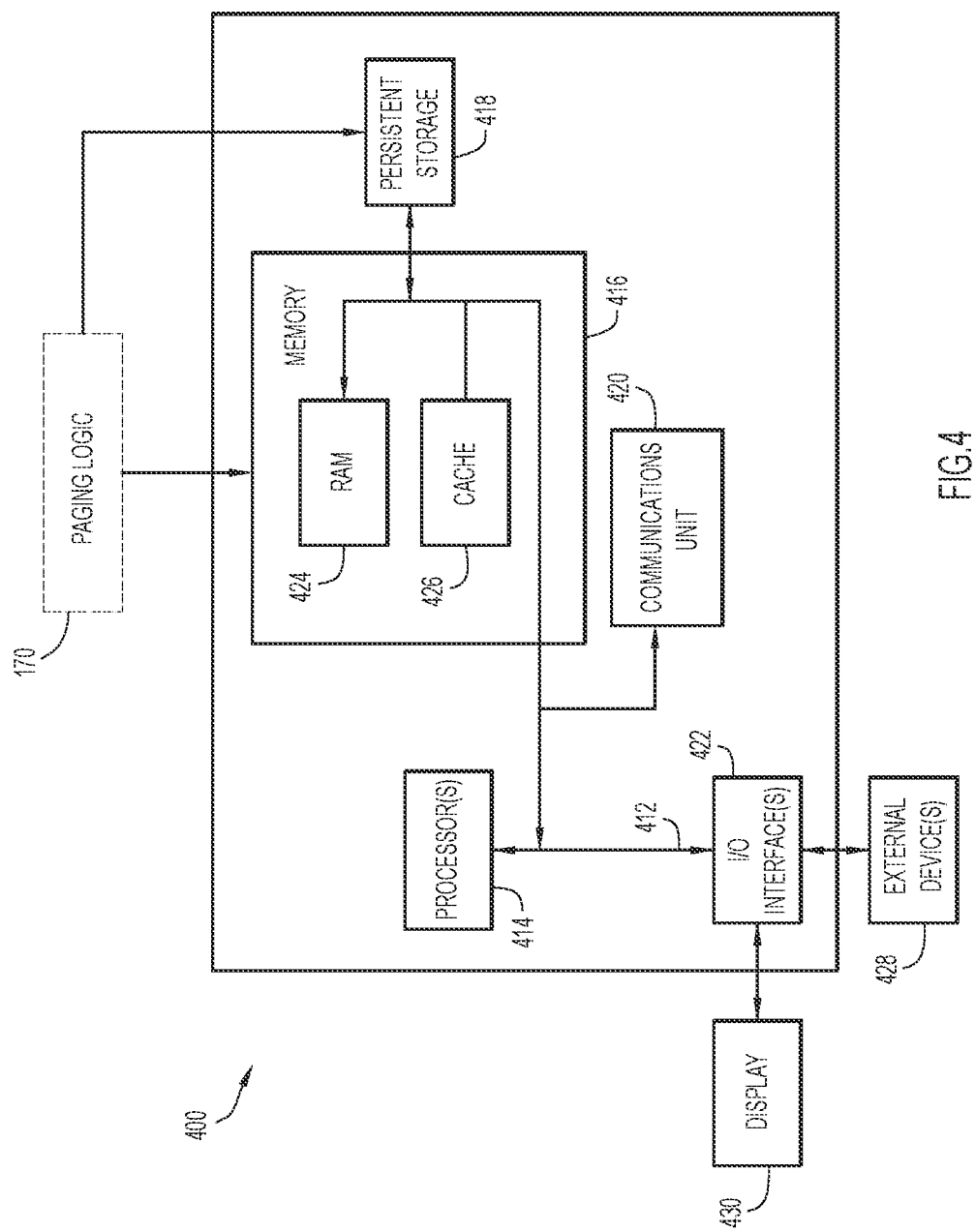
FIG. 4 illustrates a block diagram of a computing device configured to support UE paging, according to an example embodiment.

FIG. 4 illustrates a hardware block diagram of an example device 400 configured to support UE paging (e.g., CTF 135). It should be appreciated that FIG. 4 provides only an illustration of one embodiment and does not imply any limitations with regard to the environments in which different embodiments may be implemented. Many modifications to the depicted environment may be made.

As depicted, the device 400 includes a bus 412, which provides communications between computer processor(s) 414, memory 416, persistent storage 418, communications unit 420, and Input/Output (I/O) interface(s) 422. Bus 412 can be implemented with any architecture designed for passing data and/or control information between processors (such as microprocessors, communications and network processors, etc.), system memory, peripheral devices, and any other hardware components within a system. For example, bus 412 can be implemented with one or more buses.

Memory 416 and persistent storage 418 are computer readable storage media. In the depicted embodiment, memory 416 includes Random Access Memory (RAM) 424 and cache memory 426. In general, memory 416 can include any suitable volatile or non-volatile computer readable storage media. Instructions for paging logic 170 may be stored in memory 416 or persistent storage 418 for execution by computer processor(s) 414.

One or more programs may be stored in persistent storage 418 for execution by one or more of the respective computer processors 414 via one or more memories of memory 416. The persistent storage 418 may be a magnetic hard disk drive, a solid state hard drive, a semiconductor storage device, Read-Only Memory (ROM), Erasable Programmable ROM (EPROM), Flash memory, or any other computer readable storage media that is capable of storing program instructions or digital information.

The media used by persistent storage 418 may also be removable. For example, a removable hard drive may be used for persistent storage 418. Other examples include optical and magnetic disks, thumb drives, and smart cards that are inserted into a drive for transfer onto another computer readable storage medium that is also part of persistent storage 418.

Communications unit 420, in these examples, provides for communications with other data processing systems or devices. In these examples, communications unit 420 includes one or more network interface cards. Communications unit 420 may provide communications through the use of either or both physical and wireless communications links.

I/O interface(s) 422 allows for input and output of data with other devices that may be connected to device 400. For example, I/O interface(s) 422 may provide a connection to external devices 428 such as a keyboard, keypad, a touch screen, and/or some other suitable input device. External devices 428 can also include portable computer readable storage media such as database systems, thumb drives, portable optical or magnetic disks, and memory cards.

Software and data used to practice embodiments can be stored on such portable computer readable storage media and can be loaded onto persistent storage 418 via I/O interface(s) 422. I/O interface(s) 422 may also connect to a display 430. Display 430 provides a mechanism to display data to a user and may be, for example, a computer monitor.

Figure 5:
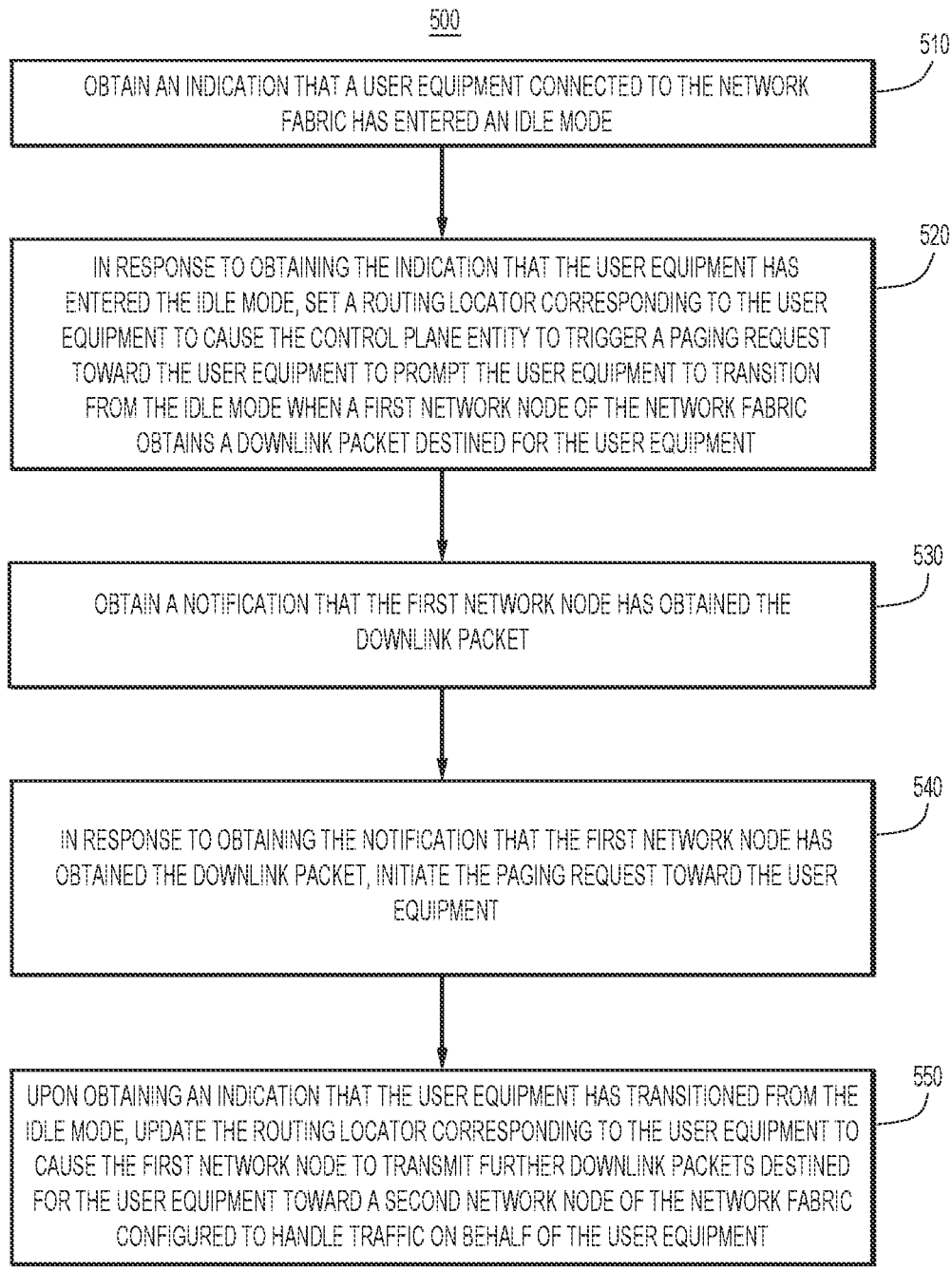
FIG. 5 illustrates a flowchart of method for supporting UE paging, according to an example embodiment.

FIG. 5 is a flowchart of an example method 500 for supporting UE paging. In this example, a control plane entity of a network fabric (e.g., CTF 135) performs method 500. At 510, the control plane entity obtains an indication that a UE connected to the network fabric has entered an idle mode. At 520, in response to obtaining the indication that the UE has entered the idle mode, the control plane entity sets a routing locator corresponding to the UE to cause the control plane entity to trigger a paging request toward the UE to prompt the UE to transition from the idle mode when a first network node of the network fabric obtains a downlink packet destined for the user equipment. At 530, the control plane entity obtains a notification that the first network node has obtained the downlink packet. At 540, in response to obtaining the notification that the first network node has obtained the downlink packet, the control plane entity initiates the paging request toward the UE. At 550, upon obtaining an indication that the UE has transitioned from the idle mode, the control plane entity updates the routing locator corresponding to the UE to cause the first network node to transmit further downlink packets destined for the UE toward a second network node of the network fabric configured to handle traffic on behalf of the UE.

Techniques described herein may enable an interworking between elements of the 3GPP control plane and the fabric user plane based on LISP architecture to support 3GPP UE paging procedures in the fabric user plane. In one example, the network may, for a transient period of time, bring a CTF in the forwarding path for downlink traffic destined for UE 105 to indicate when the downlink traffic has been received. In other examples, the CTF may receive one or more control plane messages to indicate when the downlink traffic has been received. Once the CTF determines that the downlink traffic has been received, the CTF may initiate paging procedures, and may subsequently reverse the state when the UE wakes up and goes into connected mode. Furthermore, this approach need not require any changes on the UE stack.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, key-board, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, Compact Disc ROM (CD-ROM), Digital Versatile Disk (DVD), memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, EPROM, Flash memory, a Static RAM (SRAM), a portable CD-ROM, a DVD, a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a LAN, a WAN, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, Instruction-Set-Architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one form, a method is provided. The method comprises: at a control plane entity of a network fabric: obtaining an indication that a user equipment connected to the network fabric has entered an idle mode; in response to obtaining the indication that the user equipment has entered the idle mode, setting a routing locator corresponding to the user equipment to cause the control plane entity to trigger a paging request toward the user equipment to prompt the user equipment to transition from the idle mode when a first network node of the network fabric obtains a downlink packet destined for the user equipment; obtaining a notification that the first network node has obtained the downlink packet; in response to obtaining the notification that the first network node has obtained the downlink packet, initiating the paging request toward the user equipment; and upon obtaining an indication that the user equipment has transitioned from the idle mode, updating the routing locator corresponding to the user equipment to cause the first network node to transmit further downlink packets destined for the user equipment toward a second network node of the network fabric configured to handle traffic on behalf of the user equipment.

In one example, setting the routing locator corresponding to the user equipment includes setting the routing locator to a routing locator of the control plane entity. In a further example, obtaining the notification that the first network node has obtained the downlink packet includes obtaining the downlink packet. In another further example, the method further comprises: at the control plane entity: buffering the downlink packet; and in response to updating the routing locator, providing the downlink packet to the user equipment.

In one example, setting the routing locator corresponding to the user equipment includes setting the routing locator to a routing locator of the first network node. In a further example, the first network node buffers the downlink packet and provides the downlink packet to the user equipment in response to the control plane entity updating the routing locator. In another further example, obtaining the notification that the first network node has obtained the downlink packet includes obtaining a control plane message from the first network node. In still another further example, obtaining the notification that the first network node has obtained the downlink packet includes obtaining a control plane message from another control plane entity. In one example, the other control plane entity is a Locator Identity Separation Protocol (LISP) Map-Server.

In another form, an apparatus is provided. The apparatus comprises: a network interface configured to obtain or provide network communications in a network fabric; and one or more processors coupled to the network interface, wherein the one or more processors are configured to: obtain an indication that a user equipment connected to the network fabric has entered an idle mode; in response to obtaining the indication that the user equipment has entered the idle mode, set a routing locator corresponding to the user equipment to cause the apparatus to trigger a paging request toward the user equipment to prompt the user equipment to transition from the idle mode when a first network node of the network fabric obtains a downlink packet destined for the user equipment; obtain a notification that the first network node has obtained the downlink packet; in response to obtaining the notification that the first network node has obtained the downlink packet, initiate the paging request toward the user equipment; and upon obtaining an indication that the user equipment has transitioned from the idle mode, update the routing locator corresponding to the user equipment to cause the first network node to transmit further downlink packets destined for the user equipment toward a second network node of the network fabric configured to handle traffic on behalf of the user equipment.

In another form, one or more non-transitory computer readable storage media are provided. The non-transitory computer readable storage media are encoded with processing instructions that, when executed by a processor of a control plane entity of a network fabric, cause the processor to: obtain an indication that a user equipment connected to the network fabric has entered an idle mode; in response to obtaining the indication that the user equipment has entered the idle mode, set a routing locator corresponding to the user equipment to cause the control plane entity to trigger a paging request toward the user equipment to prompt the user equipment to transition from the idle mode when a first network node of the network fabric obtains a downlink packet destined for the user equipment; obtain a notification that the first network node has obtained the downlink packet; in response to obtaining the notification that the first network node has obtained the downlink packet, initiate the paging request toward the user equipment; and upon obtaining an indication that the user equipment has transitioned from the idle mode, update the routing locator corresponding to the user equipment to cause the first network node to transmit further downlink packets destined for the user equipment toward a second network node of the network fabric configured to handle traffic on behalf of the user equipment.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    at a control plane entity of a network fabric:
        obtaining an indication that a user equipment connected to the network fabric has entered an idle mode;
        in response to obtaining the indication that the user equipment has entered the idle mode, setting a routing locator corresponding to the user equipment to cause the control plane entity to trigger a paging request toward the user equipment to prompt the user equipment to transition from the idle mode when a first network node of the network fabric obtains a downlink packet destined for the user equipment;

obtaining a notification that the first network node has obtained the downlink packet;

in response to obtaining the notification that the first network node has obtained the downlink packet, initiating the paging request toward the user equipment; and upon obtaining an indication that the user equipment has transitioned from the idle mode, updating the routing locator corresponding to the user equipment to cause the first network node to transmit further downlink packets destined for the user equipment toward a second network node of the network fabric configured to handle traffic on behalf of the user equipment.

2. The method of claim 1, wherein:

setting the routing locator corresponding to the user equipment includes setting the routing locator to a routing locator of the control plane entity.

3. The method of claim 2, wherein:

obtaining the notification that the first network node has obtained the downlink packet includes obtaining the downlink packet.

4. The method of claim 2, further comprising:

at the control plane entity:
 buffering the downlink packet; and
 in response to updating the routing locator, providing the downlink packet to the user equipment.

5. The method of claim 1, wherein:

setting the routing locator corresponding to the user equipment includes setting the routing locator to a routing locator of the first network node.

6. The method of claim 5, wherein the first network node buffers the downlink packet and provides the downlink packet to the user equipment in response to the control plane entity updating the routing locator.

7. The method of claim 5, wherein:

obtaining the notification that the first network node has obtained the downlink packet includes obtaining a control plane message from the first network node.

8. The method of claim 5, wherein:

obtaining the notification that the first network node has obtained the downlink packet includes obtaining a control plane message from another control plane entity.

9. The method of claim 8, wherein the other control plane entity is a Locator Identity Separation Protocol (LISP) Map-Server.

10. An apparatus comprising:

a network interface configured to obtain or provide network communications in a network fabric; and one or more processors coupled to the network interface, wherein the one or more processors are configured to:
 obtain an indication that a user equipment connected to the network fabric has entered an idle mode;
 in response to obtaining the indication that the user equipment has entered the idle mode, set a routing locator corresponding to the user equipment to cause the apparatus to trigger a paging request toward the user equipment to prompt the user equipment to transition from the idle mode when a first network node of the network fabric obtains a downlink packet destined for the user equipment;
 obtain a notification that the first network node has obtained the downlink packet;
 in response to obtaining the notification that the first network node has obtained the downlink packet, initiate the paging request toward the user equipment; and
 upon obtaining an indication that the user equipment has transitioned from the idle mode, update the routing locator corresponding to the user equipment to cause the first network node to transmit further downlink packets destined for the user equipment toward a second network node of the network fabric configured to handle traffic on behalf of the user equipment.

11. The apparatus of claim 10, wherein the one or more processors are further configured to:

set the routing locator to a routing locator of the apparatus;
obtain the downlink packet;
buffer the downlink packet; and
in response to updating the routing locator, provide the downlink packet to the user equipment.

12. The apparatus of claim 10, wherein the one or more processors are further configured to:

set the routing locator to a routing locator of the first network node, wherein the first network node buffers the downlink packet and provides the downlink packet to the user equipment.

13. The apparatus of claim 12, wherein the one or more processors are further configured to:

obtain a control plane message from the first network node.

14. The apparatus of claim 12, wherein the one or more processors are further configured to:

obtain a control plane message from another control plane entity.

15. The apparatus of claim 14, wherein the control plane entity is a Locator Identity Separation Protocol (LISP) Map-Server.

16. One or more non-transitory computer readable storage media encoded with processing instructions that, when executed by a processor of a control plane entity of a network fabric, cause the processor to:

obtain an indication that a user equipment connected to the network fabric has entered an idle mode;

in response to obtaining the indication that the user equipment has entered the idle mode, set a routing locator corresponding to the user equipment to cause the control plane entity to trigger a paging request toward the user equipment to prompt the user equipment to transition from the idle mode when a first network node of the network fabric obtains a downlink packet destined for the user equipment;

obtain a notification that the first network node has obtained the downlink packet;

in response to obtaining the notification that the first network node has obtained the downlink packet, initiate the paging request toward the user equipment; and upon obtaining an indication that the user equipment has transitioned from the idle mode, update the routing locator corresponding to the user equipment to cause the first network node to transmit further downlink packets destined for the user equipment toward a second network node of the network fabric configured to handle traffic on behalf of the user equipment.

17. The one or more non-transitory computer readable storage media of claim 16, wherein the processing instructions further cause the processor to:
- set the routing locator to a routing locator of the control plane entity;
- obtain the downlink packet;
- buffer the downlink packet; and
- in response to updating the routing locator, provide the downlink packet to the user equipment.

18. The one or more non-transitory computer readable storage media of claim 16, wherein the processing instructions further cause the processor to:
- set the routing locator to a routing locator of the first network node, wherein the first network node buffers the downlink packet and provides the downlink packet to the user equipment.

19. The one or more non-transitory computer readable storage media of claim 16, wherein the processing instructions further cause the processor to:
- obtain a control plane message from the first network node.

20. The one or more non-transitory computer readable storage media of claim 16, wherein the processing instructions further cause the processor to:
- obtain a control plane message from a Locator Identity Separation Protocol (LISP) Map-Server.

* * * * *